United States Patent [19]

Sano et al.

[11] Patent Number: 4,756,587
[45] Date of Patent: Jul. 12, 1988

[54] OPTICAL MULTI/DEMULTIPLEXER

[75] Inventors: Hirohisa Sano, Kokubunji; Katsuyuki Imoto, Sayama; Minoru Maeda, Nishitama, all of Japan

[73] Assignee: Hitachi, Ltd., Tokyo, Japan

[21] Appl. No.: 84,124

[22] Filed: Aug. 12, 1987

[30] Foreign Application Priority Data

Aug. 20, 1986 [JP] Japan .................................. 61-192885

[51] Int. Cl.⁴ .................................................. G02B 6/10
[52] U.S. Cl. .................................................. 350/96.12
[58] Field of Search ................ 350/96.11, 96.12, 96.16

[56] References Cited

U.S. PATENT DOCUMENTS 4,483,583 11/1984 Unger ............................... 350/96.12

Primary Examiner—William L. Sikes
Assistant Examiner—Robert E. Wise
Attorney, Agent, or Firm—Antonelli, Terry & Wands

[57] ABSTRACT

An optical multi/demultiplexer comprising a first waveguide for inputting/outputting light, second and third waveguides which are respectively arranged on both sides of the first waveguide, and first and second open-waveguides which are respectively arranged on sides of the second and third waveguides remote from the first waveguide.

6 Claims, 9 Drawing Sheets

OPTICAL MULTI/DEMULTIPLEXER

BACKGROUND OF THE INVENTION

The present invention relates to an optical multi/-demultiplexer which is small in size and has a high performance of wavelength separability and which constitutes a wavelength division multiplex transmission system.

An optical multi/demultiplexer of the directional coupler type is constructed by utilizing the fact that the coupling characteristic between two waveguides exhibits a wavelength dependence. Such techniques are described in, for example, "FREQUENCY-SELECTIVE COUPLING IN PARALLEL DIELECTRIC WAVEGUIDES" by H. F. TAYLOR, OPTICS COMMUNICATIONS, Volume 8, number 4, pp. 421–425, August 1973, and Japanese Patent Application Laid-open No. 14205/1985. The wavelength dependence of the coupling characteristic is fundamentally divided into two classes; (i) one based on the difference of the propagation characteristics of the two waveguides, and (ii) the other based on the degree of coupling which varies depending upon wavelengths. With either class, however, only one stage is difficult of attaining a satisfactory inter-wavelength separation. As a method of enhancing characteristics, there has heretofore been known an example described in "Filter Characteristics of Codirectionally Coupled Waveguides with Weighted Coupling" by R. C. ALFERNESS et al., IEEE JOURNAL OF QUANTUM ELECTRONICS, VOL. QE-14, NO. 11, pp. 843–847, NOVEMBER 1978. As described in "Directional Coupler Type Optical Demultiplexing Device" by SASAKI et al. ('78 General National Meeting of the Japan Society of Electronics and Communication Engineering, S6-2), a method has also been proposed in which an optical coupling/branching device is constructed by connecting optical couplers in many stages, thereby to improve characteristics. In this case, however, the device becomes large in size inevitably. Usually the length of one coupler is on the order of several mm, so that the device constructed of the multistage couplers by the use of the prior art becomes as large as several cm. Since the present-day micro-processing technology has progressed premising on the production of IC chips of several mm square, the application thereof to the device of the size of several cm is difficult. Even if the technology can be applied, the productivity will inevitably lower. Also in the aspects of device performance characteristics, the enlarged size of the device poses the problem that an insertion loss increases.

SUMMARY OF THE INVENTION

An object of the present invention is to provide an optical multi/demultiplexer which is small in size, which exhibits a low loss and which has a favorable wavelength-separation characteristic.

In order to improve the wavelength-separation characteristic, the multi/demultiplexer of the present invention is constructed of a first waveguide for inputting-/outputting light, second and third waveguides which are respectively arranged on both the sides of the first waveguide, and first and second open-waveguides which ar respectively arranged on the sides of the second and third waveguides remote from the first waveguide. Here, the respectively adjacent waveguides are set so as to differ in refractive index and structural dimensions from each other, and the coupling between the waveguides has a wavelength selectivity. The characterizing feature of the present invention consists in that the couplers having the wavelength selectivities as stated above are arrayed in parallel to construct a composite coupler.

More concretely, lights of wavelengths $\lambda_1$ and $\lambda_2$ propagating through the first waveguide are respectively coupled to the second and third waveguides in accordance with the wavelength selectivities of the coupling between the first and second waveguides and the coupling between the first and third waveguides. That is, the light of the wavelength $\lambda_1$ is transferred to the second waveguide, and that of the wavelength $\lambda_2$ to the third waveguide. On this occasion, however, the light of the wavelength $\lambda_2$ leaks into the second waveguide, while the light of the wavelength $\lambda_1$ leaks into the third waveguide.

The first and second open-waveguides have their refractive indices and effective cross-sectional areas designed so as to couple with the second and third waveguides selectively at the wavelengths $\lambda_2$ and $\lambda_1$, respectively. Therefore, the lights of the wavelengths $\lambda_2$ and $\lambda_1$ having leaked into the second and third waveguides are respectively delivered to the first and second open-waveguides. The delivered lights are radiated from the ends of the open-waveguides and do not return to the second and third waveguides again, so that the isolation is enhanced.

BRIEF DESCRIPTION OF THE DRAWINGS

FIGS. 1(a) and 1(b) show the first embodiment of an optical coupling/branching device according to the present invention, in which FIG. 1(a) is a plan view, while FIG. 1(b) is a sectional view taken along A—A;

FIGS. 4(a) and 4(b) show the second embodiment of the present invention, in which FIG. 4(a) is a plan view, while FIG. 4(b) is a sectional view taken along A—A;

FIGS. 5(a) and 5(b) show the third embodiment of the present invention, in which FIG. 5(a) is a plan view, while FIG. 5(b) is a sectional view taken along A—A;

DESCRIPTION OF THE PREFERRED EMBODIMENTS

Figure 1A:
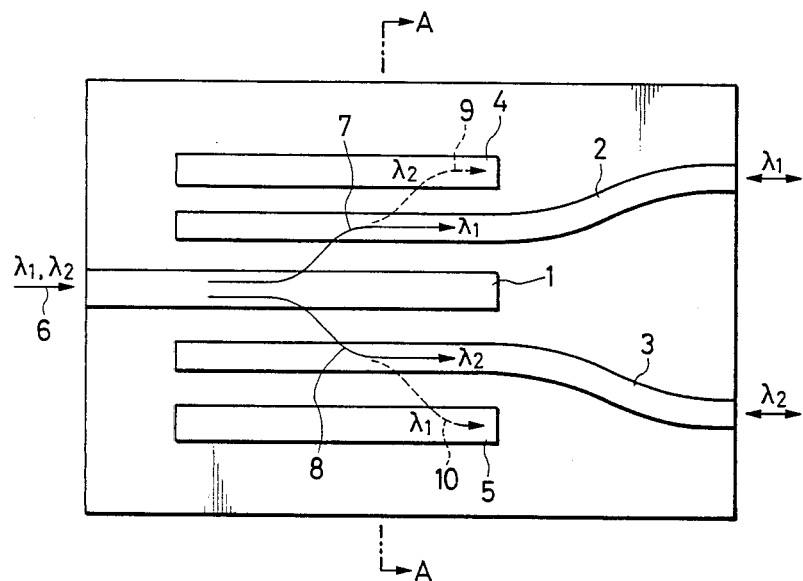
Figure 1B:
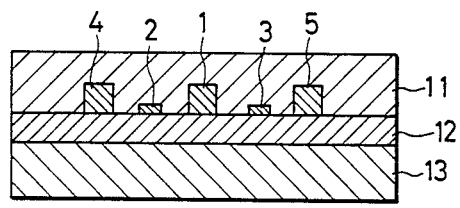

Referring to FIGS. 1(a) and 1(b), numeral 13 designates a substrate, the material of which may be selected at will from among semiconductors, dielectrics, magnetic substances, etc. Numeral 12 indicates a buffer layer which functions to optically isolate respective waveguides 1–5 from the substrate 13, and the refractive index of which must be selected lower than the refractive indices of the waveguides 1-5. The refractive index of a clad layer 11 is selected to be substantially equal to that of the buffer layer 12. The waveguides 1-5 are selected so that the adjacent ones may have refractive indices and sizes differing from each other. The optical multi/demultiplexer described above is fabricated as follows by way of example: In a case where the substrate 13 is made of Si, an SiO$_2$ layer is formed by thermal oxidation and is used as the buffer layer 12. Subsequently, SiO$_{2+TiO2}$(10-20%) is formed 2-3 $\mu$m by CVD, sputtering or the like, and a protective film is formed thereon. Thereafter, photoetching which reaches the buffer layer 12 is carried out to form the waveguides 2 and 3. Next, SiO$_2$+TiO$_2$ is stacked to a predetermined thickness by the use of CVD, sputtering or the like and is photoetched again, thereby to form the waveguides 1, 4 and 5. The clad layer 11 is formed as a protective film. The above method of fabrication illustrates one example, and the optical multi/demultiplexer of the present embodiment is not restricted thereto, but it is to be understood that the fabricating method is very conformable with IC processes.

With the optical multi/demultiplexer constructed as described above, the adjacent waveguides, for example, the waveguides 1 and 2 have unequal propagation constants ordinarily. However, it has hitherto been known that the propagation constants of the two waveguides agree at a certain wavelength only in case of selecting one of the waveguides at a higher refractive index and a smaller structural size and the other waveguide at a lower refractive index and a larger structural size. Equal propagation constants are a requisite for coupling to arise between lights which propagate through waveguides located nearby. Therefore, the coupling between the two waveguides whose propagation constants equalize at only the certain wavelength as in this case has a wavelength selectivity. In case of coupling or branching lights of wavelenths $\lambda_1$ and $\lambda_2$, the refractive indices and effective cross-sectional areas of the waveguides 1-5 are so selected that the coupling wavelength between the waveguides 1 and 2 becomes $\lambda_1$, that the coupling wavelength between the waveguides 1 and 3 becomes $\lambda_2$, that the coupling wavelength between the waveguides 3 and 5 becomes $\lambda_1$ and that the coupling wavelength between the waveguides 2 and 4 becomes $\lambda_2$. Owing to such selection, input light indicated by a solid line 6 is distributed to the waveguides 2 and 3 as shown at solid lines 7 and 8, and unnecessary lights having leaked slightly are radiated through the open-waveguides 4 and 5 as shown at broken lines 9 and 10. It is therefore possible to render the isolation between the wavelengths $\lambda_1$ and $\lambda_2$ very high.

Figure 2:
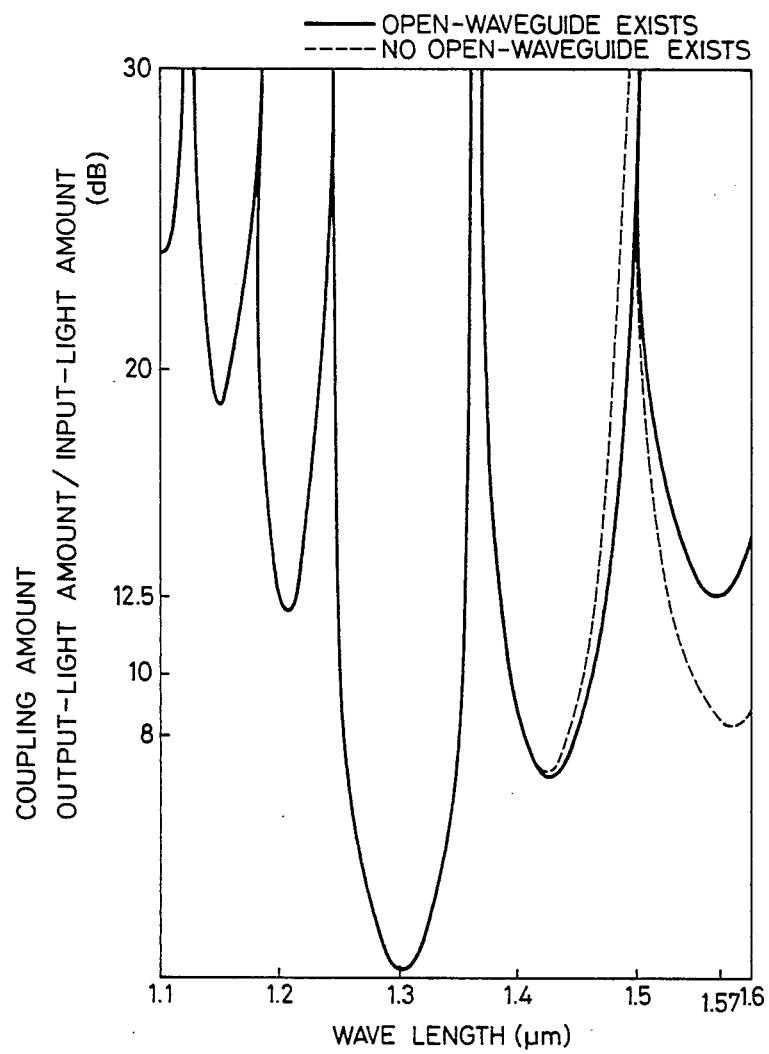
FIG. 2 is a graph showing the calculated results of the wavelength characteristics of the optical multi/-demultiplexer.

FIG. 2 is a graph showing results obtained by calculating the output of a model wherein an open-waveguide was coupled at a center wavelength of 1.57 $\mu$m by the side of a coupler having a center wavelength of 1.3 $\mu$m, in order to quantitatively acknowledge the effect based on the addition of the open-waveguides. Solid lines in the graph denote the calculated results in the presence of the open-waveguide, while broken lines denote the calculated results in the absence thereof. It is seen from FIG. 2 that the coupling amount of the light of 1.57 $\mu$m was increased from 8 dB to 12.5 dB by the addition of the open-waveguide, so the isolation became 4.5 dB higher.

Figure 3:
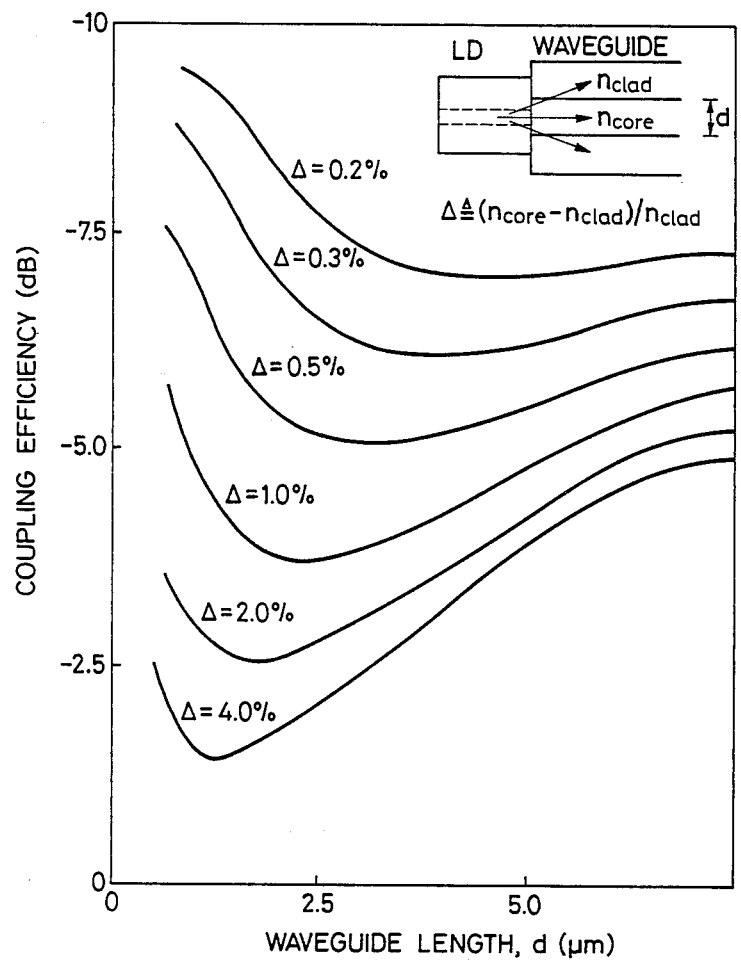
FIG. 3 is a graph showing the calculated results of the coupling efficiency between a laser diode and an optical waveguide.

FIG. 3 is a graph showing results obtained by calculating for various waveguides a coupling efficiency in the case where light emitted from a laser diode (LD) was directly coupled with the facet of each optical waveguide (coupling without employing a lens). According to FIG. 3, it is understood that raising the efficiency of coupling with the LD requires to increase (>1.0%) the core-clad index difference $\Delta[=(n_{core}-n_{clad}]$ of the optical waveguide and to make small the effective cross-sectional area of the waveguide (assuming a square cross section, the length of one side should be 1-3 $\mu$m). In this regard, in order to raise the coupling efficiency between the optical waveguide and an optical fiber, the core clad index difference $\Delta$ of the optical waveguide and the effective cross-sectional area need to be made nearly equal to those of the optical fiber ($\Delta$ of the optical fiber is about 0.5%, and the effective cross-sectional area is 5-10 $\mu$m in terms of the length of one side in case of assuming a square cross-sectional shape), and this necessity does not conform with the requirement for heightening the efficiency of coupling with the LD. The optical multi/demultiplexer of the present invention, however, exploits the coupling between the optical waveguide of higher refractive index and smaller effective cross-sectional area and the optical waveguide of lower refractive index and larger effective cross-sectional area as described above. Therefore, the former optical waveguide is used for the coupling with the LD, while the latter optical waveguide is used for the coupling with the optical fiber, whereby the coupling efficiencies of the two can be respectively heightened.

Figure 4A:
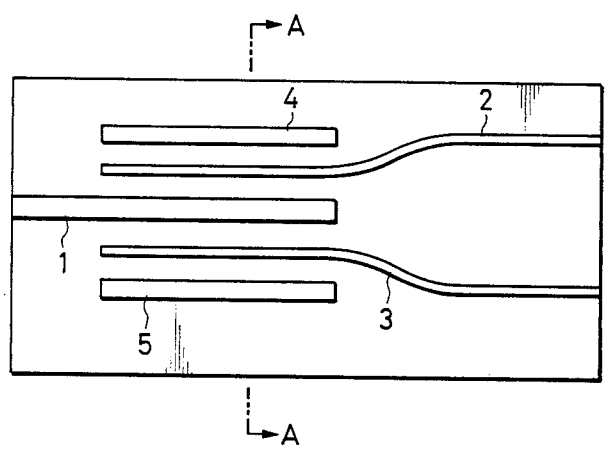
Figure 4B:
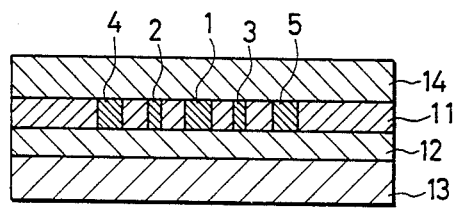

The second embodiment of the present invention shown in FIGS. 4(a) and 4(b) employs a high-polymer film as the material of optical waveguides. A substrate 13 may be made of any desired material such as a semiconductor, a dielectric or a high polymer. A buffer layer 12, a core layer 11 and a clad layer 14 are high-polymer layers which are formed by spin coating or dip coating. Since the transfer of optical waveguide patterns 1-5 into the core layer 11 is resorted to local photo-polymerization (a method which forms the optical waveguides by exploiting the fact that a monomer contained in the high-polymer film is polymerized when irradiated with light), this embodiment is conformable with IC processes. In addition, since the optical waveguides 1-5 are formed by the above method, the thicknesses thereof are all equal. Even when the thickness of the film for forming the optical waveguides is held constant in this manner, almost the same characteristics as those of the first embodiment can be attained by properly adjusting the index differences $\Delta$ and the widths of the optical waveguides.

Figure 5A:
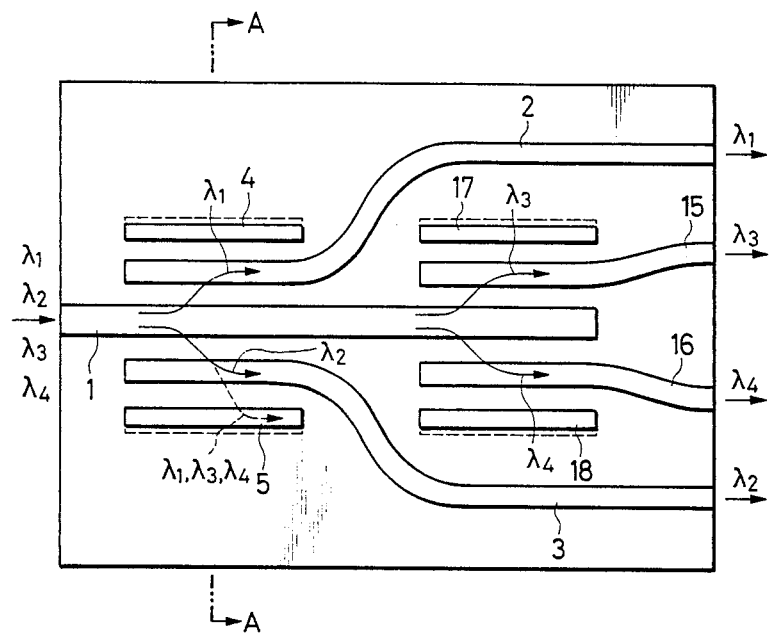
Figure 5B:
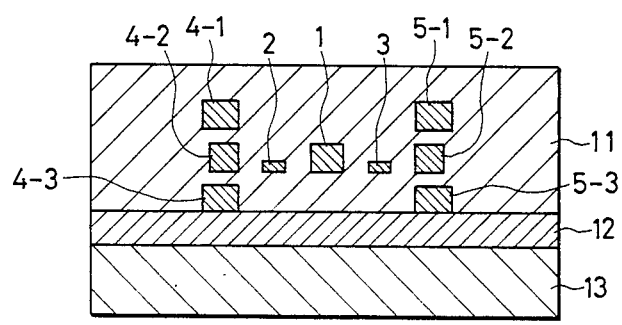

The third embodiment shown in FIGS. 5(a) and 5(b) is an optical multi/demultiplexer which couples or branches four light waves. As illustrated in the figures, the present embodiment has a structure in which two stages of the setup of the first embodiment are connected in series and in which the first stage and second stage are respectively used for coupling or branching the lights of wavelengths $\lambda_1$ and $\lambda_2$ and those of wavelengths $\lambda_3$ and $\lambda_4$. In the present embodiment, three open-waveguides form one set. This is because the number of the wavelengths of lights to be coupled or branched is four. In case of the waveguide 3 by way of example, the open-waveguides 5-1, 5-2 and 5-3 function to selectively remove the light of the wavelength $\lambda_1$, that of the wavelength $\lambda_3$ and that of the wavelength $\lambda_4$, respectively. As in the above example, the optical waveguides need not always be coplanar, and the number of the open-waveguides can be determined at will.

Figure 6A:
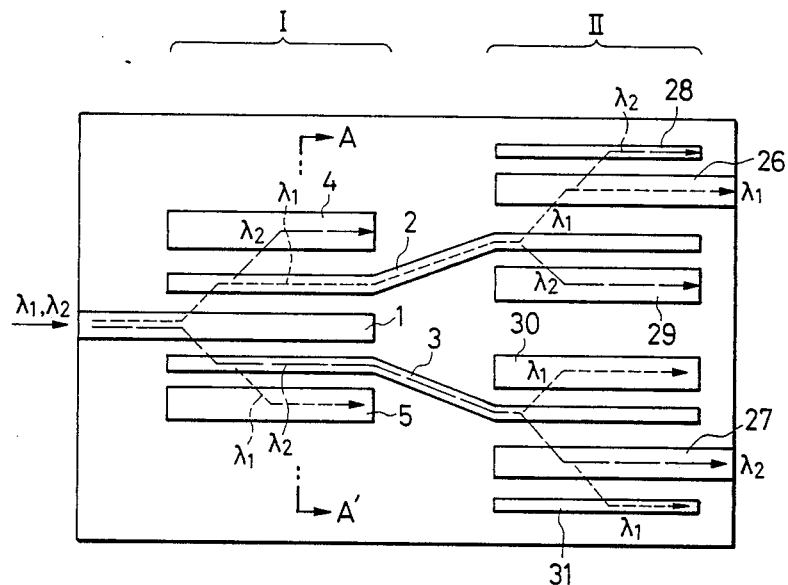
FIGS. 6(a) and 6(b) are views of another embodiment of the optical multi/demultiplexer of the present invention.
Figure 6B:
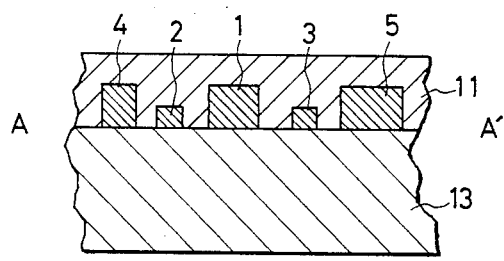

Another embodiment of the present invention will be described with reference to FIGS. 6(a) and 6(b). The optical multi/demultiplexer of the present embodiment is constructed of the series coupling of two stages of optical coupler portions indicated at I and II in FIG. 6(a). The portion I has the same setup as that of the optical multi/demultiplexer in the prior art, and lights of wavelengths $\lambda_1$ and $\lambda_2$ entering a waveguide 1 are respectively branched to waveguides 2 and 3 by the wavelength dependences of the coupling between the different sorts of waveguides. The portion II is a coupler which is formed for increasing the amount of stopping-range attenuation. In the portion II, the lights are shifted to waveguides 26 and 27 again through a process similar to that of the branching to the waveguides 2 and 3 dependent upon the wavelengths in the portion I, and they are respectively derived as output lights $\lambda_1$ and $\lambda_2$. Open-waveguides 4, 5, 28, 29, 30 and 31 serve as filters which eliminate unnecessary light components. Since, in the present embodiment, the lights pass through the two stages of couplers I and II between the input end and the output ends in this manner, the amount of stopping-range attenuation is increased approximately double as compared with the amount attainable with a single coupler, and hence, an isolation level of or above 40 dB is readily achieved. Although the waveguides 1 and 2 (3) and the waveguides 2 and 26 (3 and 27) need to have different waveguide structures, the waveguides 1 and 26 (27) can also be in the identical shape. That is, it is permitted to employ quite the same waveguide structure for the input part and the output parts. Consequently, it becomes possible to connect optical fibers of an identical sort to the input and output parts at high efficiency.

Figure 7:
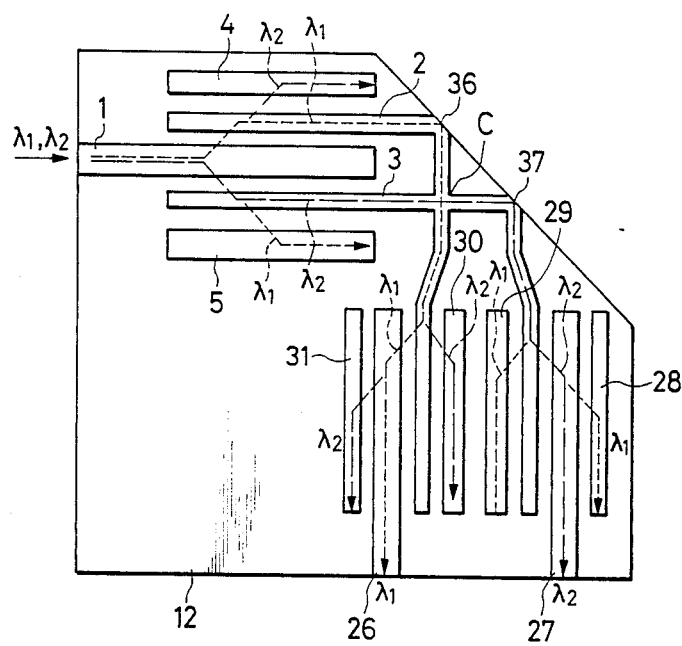
FIGS. 7, 8 and 9 are views each showing another embodiment.

FIG. 7 shows another embodiment of the present invention. This embodiment is the same as the embodiment of FIGS. 6(a) and 6(b) in the construction of the coupler portions, and it is characterized in that reflective walls 36 and 37 for changing the directions of the guided lights are inserted between the portions corresponding to the couplers I and II in FIG. 6(a). The reflective wall is an optical circuit which changes the direction of the light by the use of the total reflection thereof. Alternatively, it may be constructed by evaporating a multilayer film on the pertinent wall surface. The setup of FIG. 7 realizes the multistage connection of the couplers without increase in the length of the device.

Figure 8:
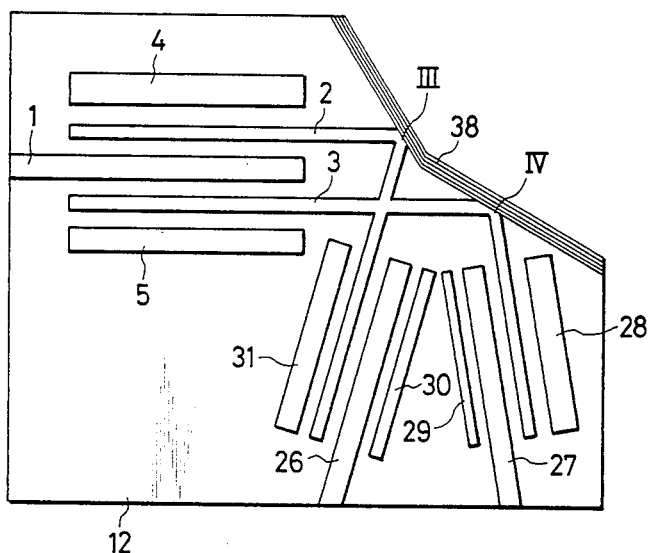

FIG. 8 shows another embodiment of the optical multi/demultiplexer of the present invention. This embodiment is the same as the embodiment of FIG. 7 in the point of adopting reflective walls, and it is characterized in that the reflective walls are formed by a multilayer film so as to utilize the wavelength selective characteristic thereof for increasing the amount of stopping-range attenuation. The multilayer film can be formed at a satisfactory precision also on the side surface of the device when evaporation, CVD or the like is employed. The reason why the mounting angles of the portions III and IV of the multilayer film differ, is that the center wavelengths of the reflection characteristics of these portions are respectively adjusted to $\lambda_1$ and $\lambda_2$.

Figure 9:
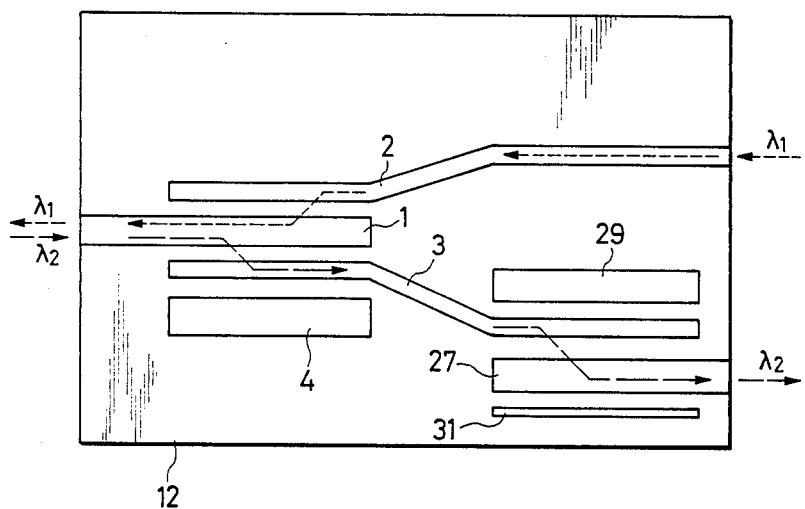

FIG. 9 shows an embodiment in which the number of open-waveguides is reduced to achieve a simplified setup. Although the wavelength separability degrades due to the reduction in the number of the open-waveguides, effects such as the curtailment of a mask preparing cost can be expected owing to decrease in the number of patterns. Particularly in case of employing an optical multi/demultiplexer for bidirectional communications, a light emitting device is connected to one of output ends, while a photodetector is connected to the other output end, so that the wavelength separation characteristic need not be very high at the output end on the light emitting device side. Therefore, it is sufficiently possible to satisfy specifications with the setup of the embodiment in FIG. 9.

Figure 10:
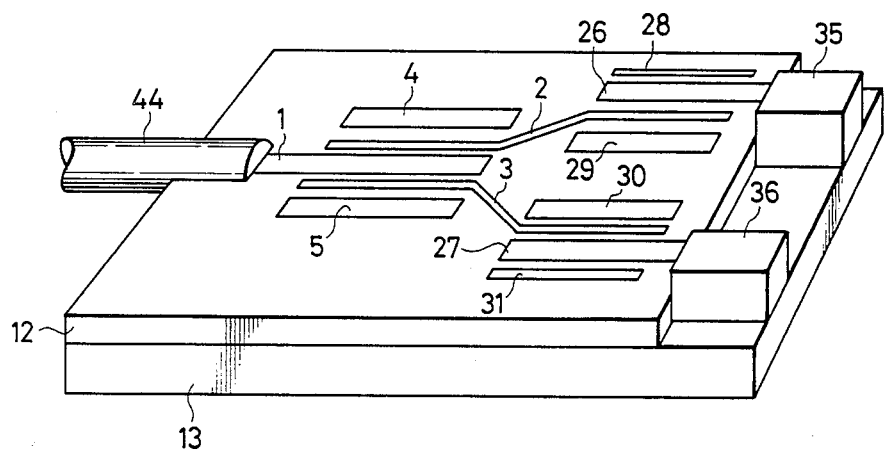
FIG. 10 is a view showing an embodiment of a wavelength division multiplex transmission module which employs the optical multi/demultiplexer of the present invention.

FIG. 10 shows an embodiment of a wavelength division multiplex transmission module to which the optical multi/demultiplexer of the persent invention is applied. In the figure, numeral 44 indicates an optical fiber, numeral 35 a light emitting device, and numeral 36 a photodetector. Although this embodiment has the optical fiber arranged on an input side and the light emitting device and the photodetector on an output side, various modifications such as a setup in which an optical fiber is connected also on the output side are considered. As the material of a substrate 13, any of various materials including a semiconductor such as Si and dielectrics such as $SiO_2$ and $LiNbO_3$ is usable. In particular, when the semiconductor substrate (especially, of GaAs or InP) is employed, the module including even the light emitting device and the photodetector can be constructed monolithically, and such a construction is promising.

Figure 11:
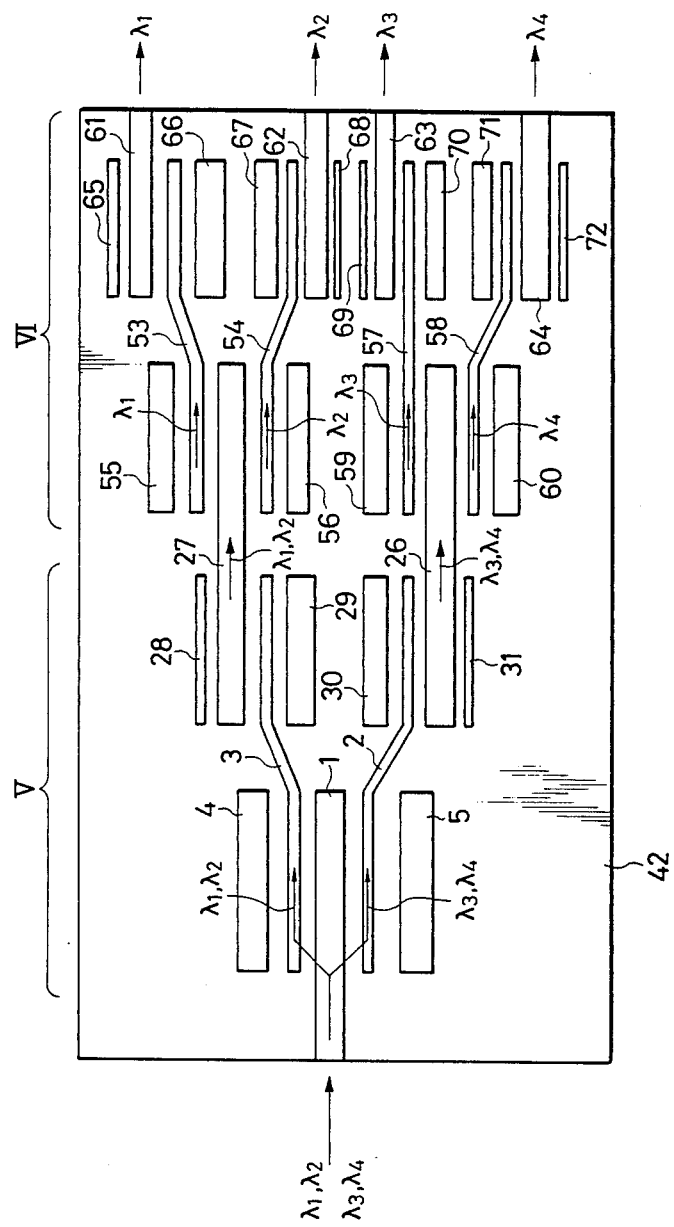
FIG. 11 shows another embodiment of the optical multi/demultiplexer of the present invention.

FIG. 11 shows another embodiment of the optical multi/demultiplexer of the present invention. In the figure, numerals 53, 54, 57, 58, 61, 62, 63 and 64 denote waveguides, and numerals 55, 56, 59, 60, 65, 66, 67, 69, 70, 71 and 72 denote open-waveguides. This embodiment is characterized in that the optical multi/demultiplexer each corresponding to the embodiment of FIGS. 6(a) and 6(b) are connected in series in two stages, thereby to couple or branch four light waves. Lights isolated into two wavelength groups of wavelengths $\lambda_1$ and $\lambda_2$ and wavelengths $\lambda_3$ and $\lambda_4$ in a portion V in the figure, are further isolated into four waves and taken out by the multi/demultiplexers of a portion VI which have characteristics of narrower bands.

As described above, with an optical multi/demultiplexer according to the present invention, at least three optical waveguides, the adjacent ones of which function as directional couplers respectively and exhibit propagation characteristics different from each other, are arranged in parallel with the propagating direction of light, whereby an optical multi/demultiplexer of good wavelength separability and low loss can be constructed in a small size. Moreover, since the optical multi/demultiplexer of the present invention is structurally simple and is conformable with present-day IC processes, economization suited to mass production can be expected.

We claim:

1. An optical multi/demultiplexer, comprising:
   a first waveguide;
   second and third waveguides which are respectively arranged on both sides of said first waveguide; and
   first and second open-waveguides which are respectively arranged on sides of said second and third waveguides remote from said first waveguide.

2. An optical multi/demultiplexer, comprising:
   a first waveguide;
   second and third waveguides which are respectively arranged on both sides of said first waveguide; and first and second open-waveguides which are respectively arranged near said second and third waveguides on their sides of said first waveguide.

3. An optical multi/demultiplexer, comprising:
a waveguide for inputting light;
at least one waveguide for outputting light, which is arranged near the light inputting waveguide; and
an open-waveguide which is arranged near the light outputting waveguide.

4. An optical multi/demultiplexer as defined in claim 3, wherein an optical fiber is connected to one end of said light inputting waveguide, and a photosensor is connected to one end of said light outputting waveguide.

5. An optical multi/demultiplexer as defined in claim 3, further comprising another waveguide for outputting light, which is arranged near said light inputting waveguide on a side opposite the first-mentioned light outputting waveguide, and another open-waveguide which is arranged near the other light outputting waveguide.

6. An optical multi/demultiplexer as defined in claim 3, further comprising another waveguide for outputting light, which is arranged near said light inputting waveguide on the same side as the first-mentioned light outputting waveguide, and another open-waveguide which is arranged near the other light outputting waveguide.

* * * * *